US012801417B2

(12) United States Patent
Geng

(10) Patent No.: US 12,801,417 B2
(45) Date of Patent: Nov. 17, 2026

(54) METHOD FOR UPGRADING NODES IN BATCHES, RELATED APPARATUS, AND DEVICE

(71) Applicant: HUAWEI TECHNOLOGIES CO., LTD., Shenzhen (CN)

(72) Inventor: Yansong Geng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 634 days.

(21) Appl. No.: 18/352,918

(22) Filed: Jul. 14, 2023

(65) Prior Publication Data

US 2023/0359480 A1 Nov. 9, 2023

Related U.S. Application Data

(63) Continuation of application No. PCT/CN2021/072252, filed on Jan. 15, 2021.

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC ......... G06F 9/45558; G06F 2009/4557; H04L 41/0806; H04L 41/0843; H04L 41/0895; H04L 41/0893; H04L 41/0897; H04L 41/082; H04L 41/40
See application file for complete search history.

(56) References Cited

U.S. PATENT DOCUMENTS

| | | | | |
|---|---|---|---|---|
| 10,742,501 | B1 * | 8/2020 | Pianigiani | H04L 41/40 |
| 2014/0376362 | A1 * | 12/2014 | Selvaraj | H04L 41/082 370/221 |
| 2018/0367379 | A1 * | 12/2018 | Guo | G06F 11/1464 |
| 2020/0073655 | A1 | 3/2020 | Park et al. | |
| 2020/0218453 | A1 | 7/2020 | Xu | |
| 2021/0165694 | A1 * | 6/2021 | Nabi | G06F 11/1433 |
| 2022/0035626 | A1 * | 2/2022 | Kapoor | G06F 8/656 |

FOREIGN PATENT DOCUMENTS

| | | | | | |
|---|---|---|---|---|---|
| CN | 104980297 | A | | 10/2015 | |
| CN | 109525410 | A | * | 3/2019 | H04L 41/0889 |
| EP | 3410288 | A1 | | 12/2018 | |

OTHER PUBLICATIONS

Xu, Fei, English (Google) Translation of CN-109525410-A, Mar. 26, 2019, pp. 1-12. (Year: 2019).*

* cited by examiner

*Primary Examiner* — Kenneth Tang
(74) *Attorney, Agent, or Firm* — Leydig, Voit & Mayer, Ltd.

(57) ABSTRACT

This application provides a method for upgrading nodes in batches, a related apparatus, and a device, which are applicable to the communications field, and are used to ensure normal provision of a service and improve service quality in a process of upgrading the nodes in batches. The method includes: obtaining batch information for upgrading, where the batch information for upgrading includes an upgrade sequence of each group, determining a to-be-upgraded group node based on the upgrade sequence of each group, migrating a service on the to-be-upgraded group node to another non-upgraded node, and upgrading the to-be-upgraded group node.

16 Claims, 10 Drawing Sheets

METHOD FOR UPGRADING NODES IN BATCHES, RELATED APPARATUS, AND DEVICE

CROSS-REFERENCE TO RELATED APPLICATIONS

This application is a continuation of International Application No. PCT/CN2021/072252, filed on Jan. 15, 2021, the disclosure of which is hereby incorporated by reference in its entirety.

TECHNICAL FIELD

Embodiments of this application relate to the communications field, and in particular, to a method for upgrading nodes in batches, a related apparatus, and a device.

BACKGROUND

As a trend of network cloudification becomes clearer, the 3rd generation partnership project (3GPP) organization has launched the European telecommunications standards institute (ETSI) network functions virtualization (NFV) architecture. As a key technology, NFV gains wide attention from the communications industry. The standardization organization has conducted in-depth research on the NFV and applied the NFV to a plurality of phases of the industry chain. During service change and evolution of an actual network, a virtualized network function (VNF) layer in an NFV architecture also needs to be upgraded based on a service requirement.

Currently, during actual deployment of an NFV solution, a network function virtualization infrastructure (NFVI) and the VNF layer included in the NFV architecture evolve independently. Therefore, batches of I layer resources in which the VNF is located may be manually orchestrated in advance, and then the I layer resources are upgraded in batches based on a sequence of the batches. For each batch, a service is manually migrated, and then a corresponding I layer board is upgraded. After the I layer board is upgraded, the service before the upgrade is manually migrated back.

However, by manually migrating/migrating back a service, operation processing needs to be manually performed before/after each batch, and consequently an upgrade process is comparatively complex. In this case, an operation period is relatively long, an entire operation process needs to be attended, and upgrade efficiency is relatively low. This reduces service quality.

SUMMARY

Embodiments of this application provide a method for upgrading nodes in batches, a related apparatus, and a device, which are used to provide a normal service in a process of upgrading the nodes in batches. Therefore, service quality is improved while upgrade efficiency is ensured.

According to a first aspect, a method for upgrading nodes in batches is provided. The method for upgrading nodes in batches is used in a containerization scenario. In the method, batch information for upgrading is obtained by using an NFVI upgrade tool or an NFVI batch upgrade tool. The batch information for upgrading includes an upgrade sequence of each group. Then, the NFVI upgrade tool or the NFVI batch upgrade tool determines a to-be-upgraded group node based on the upgrade sequence, and the VNFM migrates a service on the to-be-upgraded group node to another non-upgraded node. Then, the NFVI upgrade tool or NFVI batch upgrade tool upgrades the to-be-upgraded group node.

In an embodiment, before the to-be-upgraded group node is upgraded, the service on the to-be-upgraded group node is migrated to the another non-upgraded node. Therefore, it can be ensured that a normal service is provided for a service in a process of upgrading the to-be-upgraded group node. Therefore, service quality is improved while upgrade efficiency is ensured.

With reference to the first aspect, in a first embodiment of the first aspect, after the to-be-upgraded group node is upgraded, the VNFM may further migrate a service on the another non-upgraded node to a group node that is upgraded.

In an embodiment, after the to-be-upgraded group node is upgraded, the service on the another non-upgraded node is migrated to the group node that is upgraded. Therefore, this ensures that each node carries a service, and ensures balanced distribution of services, thereby improving service quality.

With reference to the first embodiment of the first aspect, in a second embodiment of the first aspect, after the VNFM migrates the service on the another non-upgraded node to the group node that is upgraded, the NFVI upgrade tool or NFVI batch upgrade tool may further determine a next to-be-upgraded group node based on the upgrade sequence. Then, the VNFM migrates a service on the next to-be-upgraded group node to another non-upgraded node, and the NFVI upgrade tool or NFVI batch upgrade tool upgrades the next to-be-upgraded group node.

In an embodiment, after the to-be-upgraded group node is upgraded once, the service on the next to-be-upgraded group node may be continuously migrated, and the next to-be-upgraded group node may be upgraded. This further ensures that a normal service is provided for a service in a process of upgrading all group nodes that need to be upgraded. Therefore, service quality is improved while upgrade efficiency is ensured.

With reference to any one of the second embodiment of the first aspect, in a third embodiment of the first aspect, each group includes a node type of each group, an identifier corresponding to a group sequence of each group, a node identifier corresponding to a node in each group, and a host identifier corresponding to a node in each group. A node type of the to-be-upgraded group node is the same as that of the another non-upgraded node.

In an embodiment, information included in each group is more diversified, so that the NFVI upgrade tool or the NFVI batch upgrade tool can more accurately determine a to-be-upgraded group node. A node type of the to-be-upgraded group node is the same as that of the another non-upgraded node, so that the non-upgraded node can better carry a migrated service, thereby further improving service quality in a batch upgrade process.

With reference to any one of the third embodiment of the first aspect, in a fourth embodiment of the first aspect, before the NFVI upgrade tool or the NFVI batch upgrade tool obtains the batch information for upgrading, the NFVI batch tool or the NFVI batch upgrade tool may: obtain a node set, where each node in the node set corresponds to one node type; obtain a node batch rule set, where the node batch rule set includes a node batch rule corresponding to each node type; and perform batching on the node set based on the node batch rule set, to obtain the batch information for upgrading.

In an embodiment, the batch rule corresponding to the node type can reflect a batch rule required by a feature of the node type. Therefore, batching is performed on different node types according to the batch rule corresponding to the node type, so that groups included in the obtained batch information for upgrading can be more accurate, and the batch information for upgrading is more conformed to the upgrade sequence required by each different node type.

With reference to any one of the embodiments of the first aspect, in a fifth embodiment of the first aspect, the NFVI batch tool or the NFVI batch upgrade tool further needs to: determine a service running on a node, where the service corresponds to a service type; then determine a batch rule corresponding to the service type, and finally determine, according to the batch rule corresponding to the service type, a node batch rule corresponding to the node type.

In an embodiment, the node batch rule corresponding to the node type is determined according to the batch rule of the service type corresponding to the service running on the node. This improves feasibility of this solution and accuracy of the node batch rule.

With reference to any one of the embodiments of the first aspect, in a sixth embodiment of the first aspect, before the VNFM migrates the service on the to-be-upgraded group node to the another non-upgraded node, the VNFM may further obtain a first message, where the first message indicates the to-be-upgraded group node to be upgraded.

In an embodiment, the first message indicates the to-be-upgraded group node to be upgraded. Therefore, the VNFM may determine, by using the first message, which nodes are to-be-upgraded group nodes. In this case, the VNFM migrates a service on the to-be-upgraded group node. This improves feasibility and reliability of this solution.

With reference to any one of the embodiments of the first aspect, in a seventh embodiment of the first aspect, before upgrading the to-be-upgraded group node, the NFVI upgrade tool or the NFVI batch upgrade tool may further obtain a second message, where the second message indicates that all services on the to-be-upgraded group node are migrated to the another non-upgraded node.

In an embodiment, because the second message indicates that all services on the to-be-upgraded group node are migrated to the another non-upgraded node, after receiving the second message, the NFVI upgrade tool or the NFVI batch upgrade tool may determine that no service is carried in the to-be-upgraded group. Therefore, the to-be-upgraded group node can be upgraded without affecting a service.

With reference to any one of the embodiments of the first aspect to the fifth embodiment of the first aspect, in an eighth embodiment of the first aspect, before migrating the service on the another non-upgraded node to the group node that is upgraded, the VNFM may further obtain a third message, where the third message indicates that the to-be-upgraded group node is upgraded.

In an embodiment, because the third message indicates that the to-be-upgraded group node is upgraded, the VNFM may determine, by using the third message, that the group node is upgraded. In this case, the VNFM migrates back the service on the another non-upgraded node to a group node that is upgraded. This improves feasibility and reliability of this solution.

With reference to any one of the embodiments of the first aspect to the fifth embodiment of the first aspect, in a ninth embodiment of the first aspect, before determining the next to-be-upgraded group node based on the upgrade sequence, the NFVI upgrade tool or NFVI batch upgrade tool may further obtain a fourth message, where the fourth message indicates that the service on the another non-upgraded node is migrated to the group node that is upgraded. It may be understood that some services on the another non-upgraded node are migrated to the group node that is upgraded, but not all services are migrated, so as to ensure that all service nodes carry services at this time.

In an embodiment, because the fourth message indicates that the service on the another non-upgraded node is migrated to the upgraded group node, after receiving the fourth message, the NFVI upgrade tool or the NFVI batch upgrade tool may determine that the upgraded group node is upgraded, and starts to carry a service. In this case, the next to-be-upgraded group node may be further determined, to ensure that all to-be-upgraded group nodes are sequentially upgraded. This improves efficiency of upgrading nodes in batches, and further improves feasibility and reliability of this solution.

According to a second aspect, an apparatus for upgrading nodes in batches is provided, and the apparatus for upgrading nodes in batches is used in a containerization scenario. The apparatus for upgrading nodes in batches has some or all functions of implementing the network device in any one of the first aspect and the embodiments of the first aspect. For example, a function of the apparatus may include functions in some or all embodiments of the network device in this application, or may include a function of separately implementing any one of embodiments of this application. The function may be implemented by hardware, or may be implemented by hardware executing corresponding software. The hardware or the software includes one or more units or modules corresponding to the functions.

In an embodiment, the apparatus for upgrading nodes in batches includes:

- an obtaining module, configured to obtain batch information for upgrading, where the batch information for upgrading includes an upgrade sequence of each group;
- a determining module, configured to determine a to-be-upgraded group node based on the upgrade sequence;
- a migrating module, configured to migrate a service on the to-be-upgraded group node to another non-upgraded node; and
- an upgrading module, configured to upgrade the to-be-upgraded group node.

In an embodiment, the migrating module is further configured to: after the to-be-upgraded group node is upgraded, migrate a service on the another non-upgraded node to a group node that is upgraded.

In an embodiment, the determining module is further configured to, after the service on the another non-upgraded node is migrated to the group node that is upgraded, determine a next to-be-upgraded group node based on the upgrade sequence.

The migrating module is further configured to migrate a service on the next to-be-upgraded group node to another non-upgraded node.

The upgrading module is further configured to upgrade the next to-be-upgraded group node.

In a embodiment, each group includes a node type of each group, an identifier corresponding to a group sequence of each group, a node identifier corresponding to a node in each group, and a host identifier corresponding to the node in each group.

A node type of the to-be-upgraded group node is the same as that of the another non-upgraded node.

In an embodiment, the apparatus for upgrading nodes in batches further includes a batching module.

The obtaining module is further configured to obtain a node set before obtaining the batch information for upgrading, where each node in the node set corresponds to one node type.

The obtaining module is further configured to obtain a node batch rule set, where the node batch rule set includes a node batch rule corresponding to each node type.

The batching module is configured to perform batching on the node set based on the node batch rule set, to obtain the batch information for upgrading.

In an embodiment, the determining module is further configured to: determine a service running on a node, where the service corresponds to a service type.

The determining module is further configured to determine a batch rule corresponding to the service type.

The determining module is further configured to determine, according to the batch rule corresponding to the service type, a node batch rule corresponding to the node type.

In an embodiment, the obtaining module is further configured to obtain a first message before the service on the to-be-upgraded group node is migrated to the another non-upgraded node. The first message indicates the to-be-upgraded group node to be upgraded.

In an embodiment, the obtaining module is further configured to obtain a second message before the to-be-upgraded group node is upgraded. The second message indicates that all services on the to-be-upgraded group node are migrated to the another non-upgraded node.

In an embodiment, the obtaining module is further configured to obtain a third message before the service on the another non-upgraded node is migrated to the group node that is upgraded. The third message indicates that the to-be-upgraded group node is upgraded.

In an embodiment, the obtaining module is further configured to obtain a fourth message before the next to-be-upgraded group node is determined based on the upgrade sequence. The fourth message indicates that the service on the another non-upgraded node is migrated to the group node that is upgraded.

According to a third aspect, an apparatus for upgrading nodes in batches is provided, including a processor. The processor is coupled to a memory, and may be configured to execute instructions in the memory, to implement the method according to any embodiment of the first aspect. Optionally, the communication apparatus further includes the memory. Optionally, the communication apparatus further includes a communication interface. The processor is coupled to the communication interface. The communication interface is configured to input and/or output information. The information includes at least one of instructions and data.

In an embodiment, the communication apparatus is a network device. When the communication apparatus is the network device, the communication interface may be a transceiver or an input/output interface.

Optionally, the transceiver may be a transceiver circuit. Optionally, the input/output interface may be an input/output circuit.

In another embodiment, the communication apparatus is a chip or a chip system disposed in a network device. When the communication apparatus is the chip or the chip system disposed in the network device, the communication interface may be an input/output interface, an interface circuit, an output circuit, an input circuit, a pin, a related circuit, or the like. The processor may alternatively be embodied as a processing circuit or a logic circuit.

According to a fourth aspect, a processor is provided, including an input circuit, an output circuit, and a processing circuit. The processing circuit is configured to: receive a signal via the input circuit, and transmit a signal via the output circuit, so that the processor performs the method according to any embodiment of the first aspect.

In a process embodiment, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a fifth aspect, an apparatus for upgrading nodes in batches is provided, including a communication interface and a processor. The communication interface is coupled to the processor. The communication interface is configured to input and/or output information. The information includes at least one of instructions and data. The processor is configured to execute a computer program, so that the apparatus for upgrading nodes in batches performs the method according to any embodiment of the first aspect.

Optionally, there are one or more processors, and there are one or more memories.

According to a sixth aspect, an apparatus for upgrading nodes in batches is provided, including a processor and a memory. The processor is configured to read instructions stored in the memory, and may receive a signal through a receiver, and transmit a signal through a transmitter, so that the apparatus performs the method according to any embodiment of the first aspect.

Optionally, there are one or more processors, and there are one or more memories.

Optionally, the memory may be integrated with the processor, or the memory and the processor are separately disposed.

In a process embodiment, the memory may be a non-transitory memory, for example, a read-only memory (ROM). The memory and the processor may be integrated into one chip, or may be separately disposed in different chips. A type of the memory and a manner in which the memory and the processor are disposed are not limited in embodiments of this application.

It should be understood that in a related information exchange process, for example, sending a message may be a process of outputting the message from the processor, and receiving the message may be a process of inputting the received message to the processor. Specifically, information output by the processor may be output to the transmitter, and the input information received by the processor may be from the receiver. The transmitter and the receiver may be collectively referred to as a transceiver.

The apparatuses for upgrading nodes in batches in the fifth aspect and the sixth aspect may be chips. The processor may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor, and exist independently.

According to a seventh aspect, a computer program product is provided. The computer program product includes a computer program (which may also be referred to as code or instructions). When the computer program is run, a computer is enabled to perform the method according to any embodiment of the first aspect.

According to an eighth aspect, a computer-readable storage medium is provided. The computer-readable storage medium stores a computer program (which may also be referred to as code or instructions). When the computer program is run on a computer, the computer is enabled to perform the method according to any embodiment of the first aspect.

According to a ninth aspect, this application provides a chip system. The chip system includes a processor and an interface. The interface is configured to obtain a program or instructions. The processor is configured to invoke the program or the instructions to implement or support a network device in implementing a function in the first aspect, for example, determining or processing at least one of data and information in the foregoing method.

In an embodiment, the chip system further includes a memory. The memory is configured to store program instructions and data that are necessary for the network device. The chip system may include a chip, or may include a chip and another discrete component.

It should be noted that beneficial effects brought by the embodiments of the second aspect to the ninth aspect of this application may be understood with reference to the embodiments of the first aspect. Therefore, details are not repeated.

DESCRIPTION OF EMBODIMENTS

Figure 1:
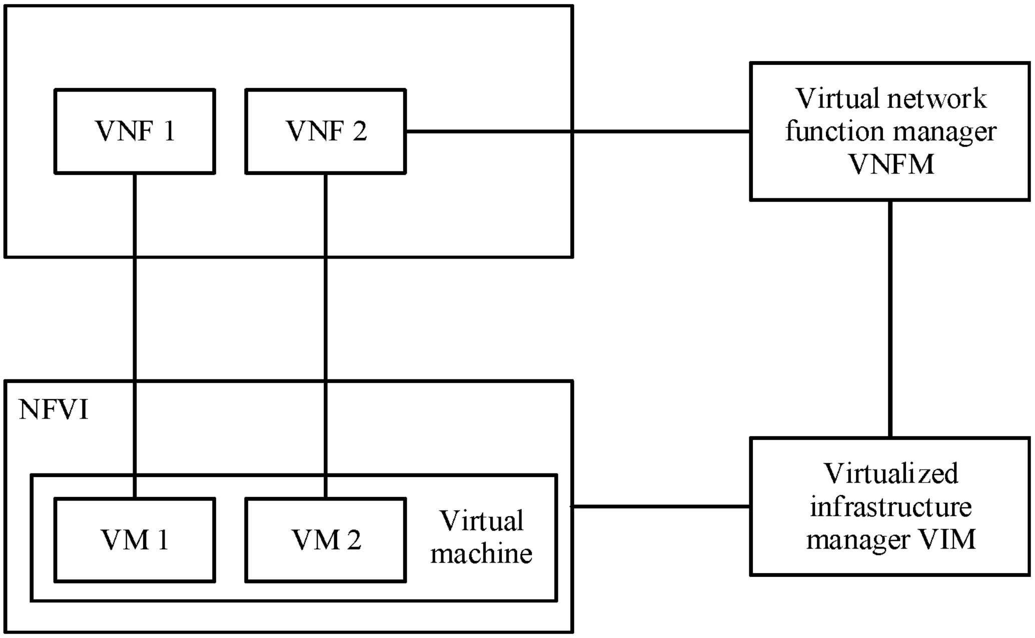
FIG. 1 is a schematic diagram of an NFV architecture according to an embodiment of this application.

The following clearly and completely describes the technical solutions in embodiments of this application with reference to the accompanying drawings in embodiments of this application. It is clear that the described embodiments are merely some but not all of embodiments of this application. For ease of understanding of embodiments of this application, the following descriptions are provided.

(1) In embodiments shown below, for a technical feature, “first”, “second”, “third”, and the like are used to distinguish between technical features in the technical feature. There is no sequential order or size order between the technical features described by “first”, “second”, and “third”.

(2) “At least one” means one or more, and “a plurality of” means two or more. “And/or” describes an association relationship between associated objects, and represents that three relationships may exist. For example, A and/or B may represent the following cases: Only A exists, both A and B exist, and only B exists, where A and B may be singular or plural. The character “/” generally indicates an “or” relationship between the associated objects. “At least one of the following items (pieces)” or a similar expression thereof refers to any combination of these items, including a single item (piece) or any combination of a plurality of items (pieces). For example, at least one of a, b, and c may represent: a, b, c, a and b, a and c, b and c, or a, b, and c, where a, b, and c each may be singular or plural.

(3) Aspects, embodiments, or features of this application are presented in embodiments disclosed in this application by describing a system that includes a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

(4) In embodiments of this application, “of (of)”, “relevant (relevant)”, and “corresponding (corresponding)” may be interchangeably used sometimes. It should be noted that meanings expressed by the terms are consistent when differences are not emphasized.

To better understand a method for upgrading nodes in batches, a related apparatus, and a device disclosed in embodiments of this application, a node described in embodiments of this application may be a virtual machine (VM) or a bare metal. The following first describes a standard architecture used in embodiments of the present invention. NFV is mainly used for a common standard in the industry for network cloudification. Based on a modern Internet technology (IT) virtualization technology, a new network product environment is provided to reduce costs, improve efficiency, and enhance agility. Universal hardware such as x86 and a virtualization technology are used to support software processing of a plurality of functions, so as to reduce high device costs of a network. Software and hardware decoupling and function abstraction may be used. In this way, a network device function is no longer dependent on special-purpose hardware. Resources can be fully and flexibly shared. A new service is quickly developed and deployed. Automatic deployment, flexible scaling, fault isolation, self-healing, and the like are performed based on an actual service requirement. In the virtualization technology, a telecommunications network function is implemented in a form of software, can run on hardware of a general-purpose server, and can be migrated, instantiated, and deployed at different physical locations of a network as required, and no new device needs to be installed.

NFV standardization mainly focuses on management and orchestration of network services, virtualized network functions, and virtualized resources. Generally, an NFV interface and architecture group working group in ETSI completes function definition in a virtual resource management and orchestration (MANO) framework. FIG. 1 is a schematic diagram of an NFV architecture according to an embodiment of this application. The NFV architecture may implement a plurality of networks, for example, a local area network (LAN), an internet protocol (internet protocol, IP) network, an evolved packet core (EPC) network, or the like. The NFV architecture may include an NFVI, a VNF, and a virtualized infrastructure manager (VIM), and a virtual network function manager (VNFM). The NFVI is a group of resources used to host and connect virtual functions. For example, the NFVI is a cloud data center including a server, a virtualized management program (hypervisor), an operating system, a virtual machine, a virtual switch, and a network resource. The VIM manages and monitors infrastructure resources (including a computing resource, a storage resource, and a network resource), such as FusionSphere and VMware. The VNFM can manage lifecycle of the VNF, including but not limited to automation capabilities such as a deployment capability, scale-out and scale-in capabilities, online and offline capabilities, and an upgrade capability, obtain, through decomposition, a requirement for a virtual resource such as a virtual machine based on a template and a VNF capacity requirement, and cooperate with the VNF and the VIM to complete functions of instantiating the VNF, and the like. In a containerization scenario (for example, a VM container or a bare metal container), the VNFM may further cooperate with a container as a service (CaaS) manager to complete functions of instantiating the VNF, and the like. The VNF includes one or more VNF components (VNFCs) at a lower function level. Further, one VNF may be deployed on a plurality of VMs, and each VM carries a function of one VNFC. The VNF may alternatively be deployed on one VM.

In addition, embodiments of this application further disclose cloud computing. Cloud computing is a new Internet-based computing mode that provides on-demand computing for individuals and enterprise users by using heterogeneous and autonomous services on the Internet. Because resources are on the Internet, and the Internet is often denoted as a cloud in a flowchart, this Internet-based computing mode may be analogized to a cloud. Cloud computing resources, provided through the Internet, are dynamically scalable and virtualized. Terminals do not need to know details of an infrastructure in the “cloud” and have corresponding professional knowledge or directly control the infrastructure. Instead, the terminals only need to focus on specific resources the terminals really need and how to obtain services via the network. Cloud computing includes three levels of services: infrastructure as a service (infrastructure as a service, IaaS), platform as a service (PaaS), and software as a service (SaaS). The PaaS is a commercial mode of providing a server platform as a service. The PaaS actually means that a software development platform is used as a service to be provided to the user in a SaaS mode. A container is an operating system-level virtualization technology, and is short for CaaS. CaaS is a specific type of platform as a service (PaaS) service. The container isolates different processes by using operating system isolation technologies, such as CGroup and NameSpace in Linux. Different from a hardware virtualization technology, the container technology does not have virtual hardware and there is no operating system but only processes inside the container. By virtue of this feature of the container technology, a container is more lightweight and easier to manage in comparison with a virtual machine. To facilitate management, in a running state of a container, a group of common management operations are defined, such as starting, stopping, pausing, and deleting the container, to manage a lifecycle of the container in a unified manner.

During actual deployment of the current NFV solution, the NFVI and the VNF layer that are included in the NFV architecture evolve independently. Therefore, batches of I layer resources in which the VNF is located may be manually orchestrated in advance, and then the I layer resources are upgraded in batches based on a sequence of the batches. For each batch, a service is manually migrated, and then a corresponding I layer board is upgraded. After the I layer board is upgraded, the service before the upgrade is manually migrated back. However, by manually migrating/migrating back a service, operation processing needs to be manually performed before/after each batch, and consequently an upgrade process is comparatively complex. In this case, an operation period is relatively long, an entire operation process needs to be attended, and upgrade efficiency is relatively low. This reduces service quality.

To resolve the foregoing problem, an embodiment of this application provides a method for upgrading nodes in batches. The method is used in a containerization scenario, and is used to ensure normal provision of a service and improve service quality in a process of upgrading the nodes in batches.

In this embodiment of this application, a tool for executing a node batching function is an NFVI batch tool, and a tool for executing a node upgrade function is an NFVI upgrade tool. The NFVI batch tool and the NFVI upgrade tool may be different tools, to separately perform batching and node upgrade. The NFVI batch tool and the NFVI upgrade tool may alternatively be integrated as a tool (an NFVI batch upgrade tool) to jointly perform functions of node batching and node upgrade. The following separately describes the foregoing two cases.

1. The NFVI Batch Tool and the NFVI Upgrade Tool are Different Tools.

Figure 2A:
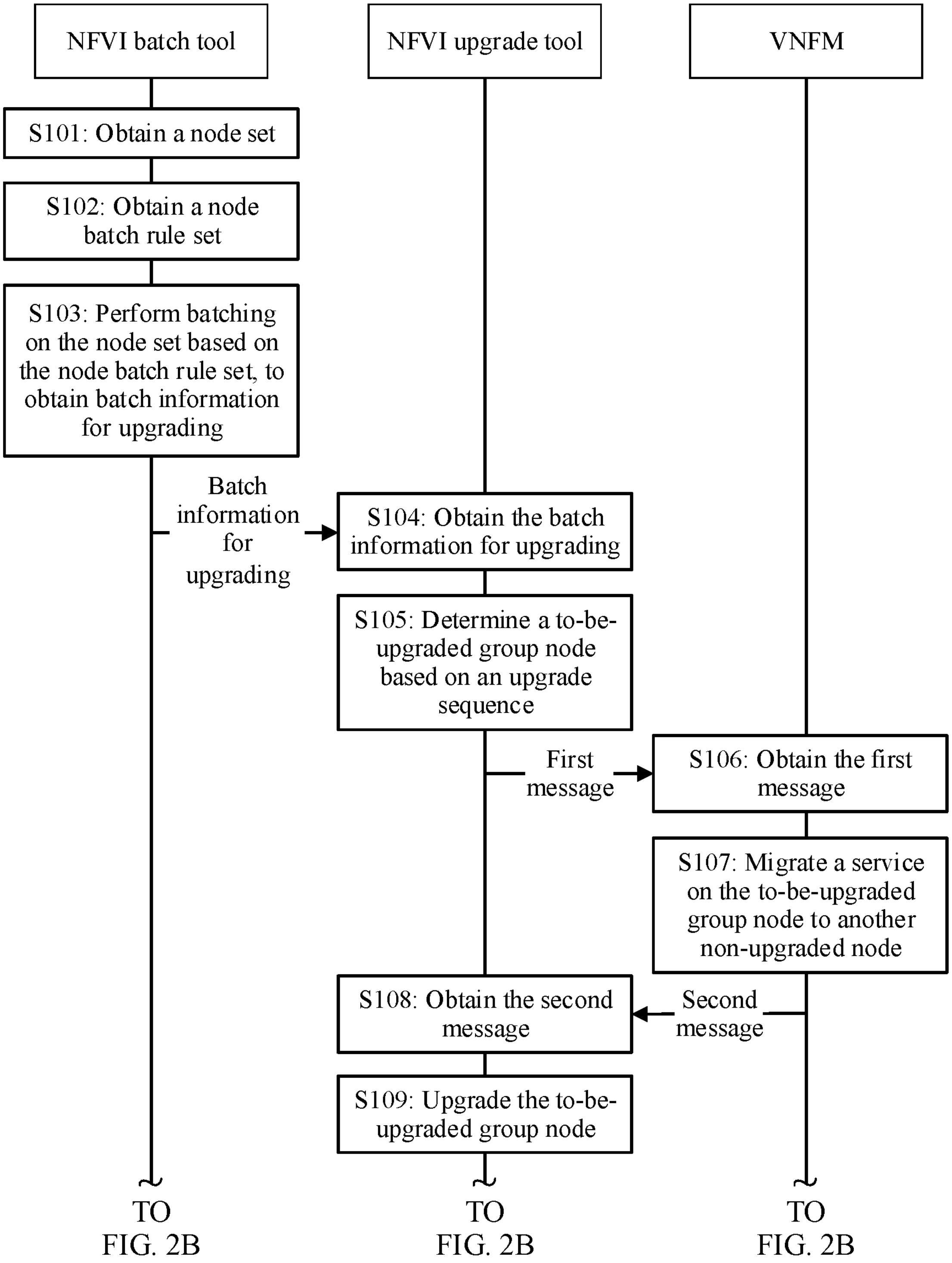
FIG. 2A and FIG. 2B are a schematic diagram of a method for upgrading nodes in batches according to an embodiment of this application.
Figure 2B:
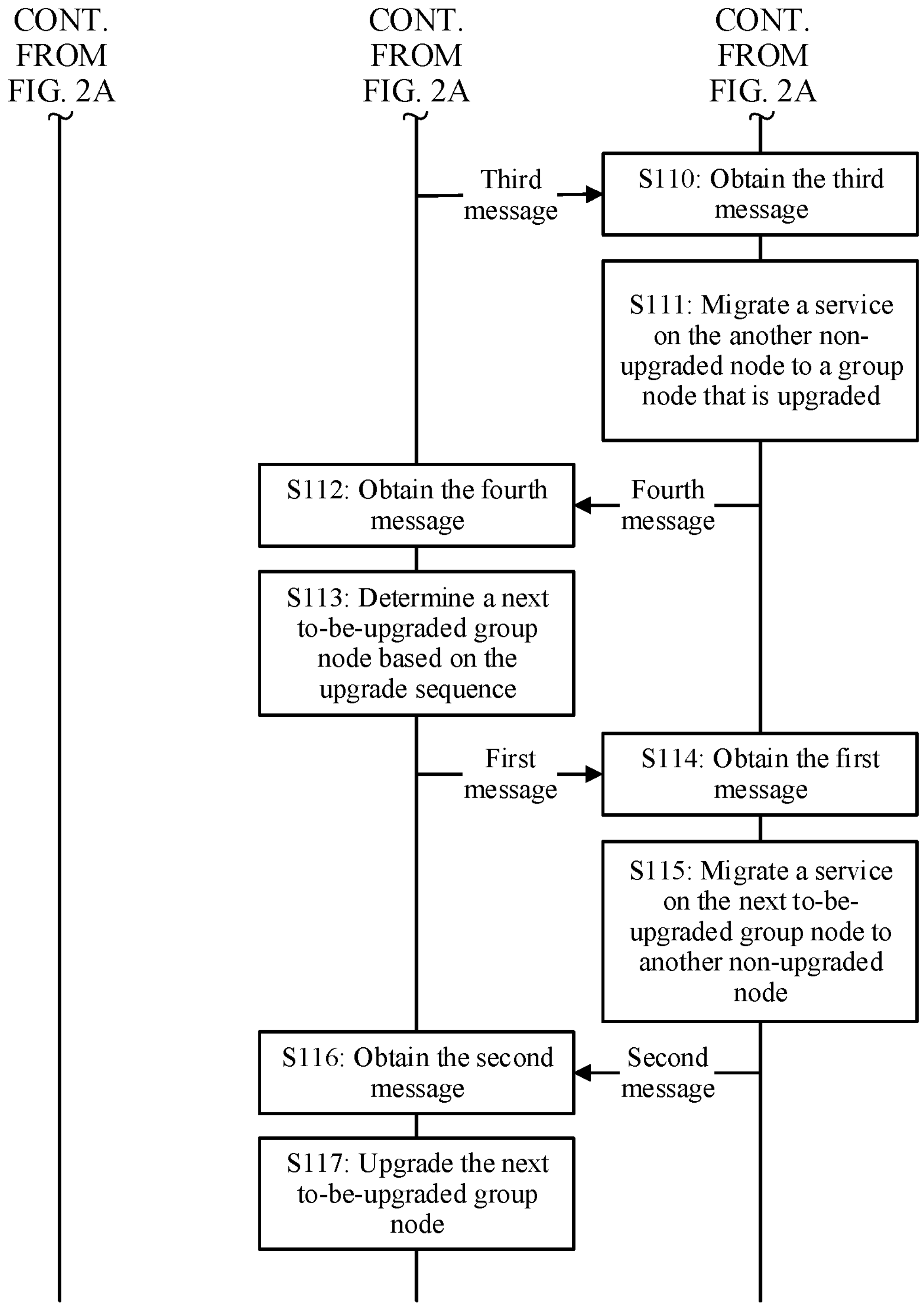

FIG. 2A and FIG. 2B are a schematic diagram of a method for upgrading nodes in batches according to an embodiment of this application. As shown in FIG. 2A and FIG. 2B, the method for upgrading nodes in batches includes the following steps.

S101: The NFVI batch tool obtains a node set.

In this embodiment, the NFVI batch tool obtains the node set, and each node in the node set corresponds to one node type. It should be understood that, in actual application, each node in the node set may further correspond to a node identifier, a node name, and a host identifier. Therefore, information corresponding to each node should be flexibly determined based on an actual situation.

For example, the NFVI batch tool obtains the node set in two manners. In one manner, the NFVI batch tool directly obtains the node set. In the other manner, an EMS obtains the node set, and delivers the obtained node set to the NFVI batch tool, so that the NFVI obtains the node set. Therefore, the foregoing two different manners of obtaining batch information for upgrading are separately described below.

(1) The NFVI Batch Tool Directly Obtains the Node Set.

Figure 3:
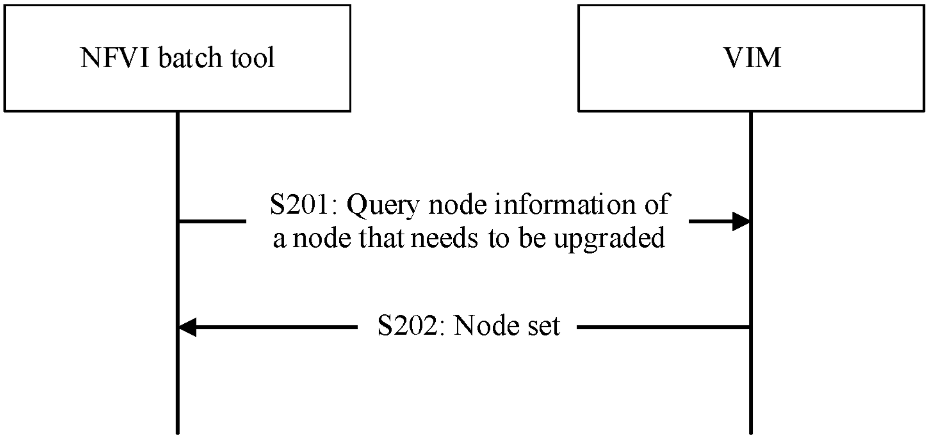
FIG. 3 is a flowchart of obtaining a node set according to an embodiment of this application.

For ease of understanding, refer to FIG. 3. FIG. 3 is a flowchart of obtaining a node set according to an embodiment of this application. As shown in FIG. 3, in step S201, the NFVI batch tool actively queries a VIM for node information of a node that needs to be upgraded. In step S202, the VIM obtains node information by managing and monitoring infrastructure layer resources, and transmits a node set including the obtained node information to the NFVI batch tool, so that the NFVI batch tool obtains the node set.

For example, refer to Table 1. Table 1 is an example of a node set in which a node is a virtual machine, and each node in the node set corresponds to a node type (Node-Type), a node identifier (Node-Id), a node name (Node-Name), and a host identifier (Host-Id).

TABLE 1

| Node identifier | Node type | Node name | Host identifier |
|---|---|---|---|
| vm-omu-id-1 | OMU_VM | OMU-1 | host-omu-id-1 |
| vm-omu-id-2 | OMU_VM | OMU-2 | host-omu-id-2 |
| vm-spu-id-1 | SPU_VM | SPU-1 | host-spu-id-1 |
| vm-spu-id-2 | SPU_VM | SPU-2 | host-spu-id-2 |
| vm-spu-id-3 | SPU_VM | SPU-3 | host-spu-id-3 |
| vm-spu-id-4 | SPU_VM | SPU-4 | host-spu-id-4 |
| vm-cpu-id-1 | CPU_VM | CPU-1 | host-cpu-id-1 |
| vm-cpu-id-2 | CPU_VM | CPU-2 | host-cpu-id-2 |

A node type corresponding to nodes with node names as “OMU-1” and “OMU-2” is “OMU_VM”. A node type corresponding to nodes with node identifiers as “vm-spu-id-1”, “vm-spu-id-2”, “vm-spu-id-3”, and “vm-spu-id-4” is “SPU_VM”. A node type corresponding to nodes with host identifiers as “host-cpu-id-1” and “host-cpu-id-2” is “CPU_VM”. Therefore, it can be learned that a node identifier, a node name, and a host identifier corresponding to each node are different. However, different nodes may be of a same node type. It should be understood that the example in Table 1 is merely used for understanding this solution. Specific information corresponding to each node should be flexibly determined based on an actual situation.

(2) The NFVI Batch Tool Obtains a Node Set by Using an EMS.

Figure 4:
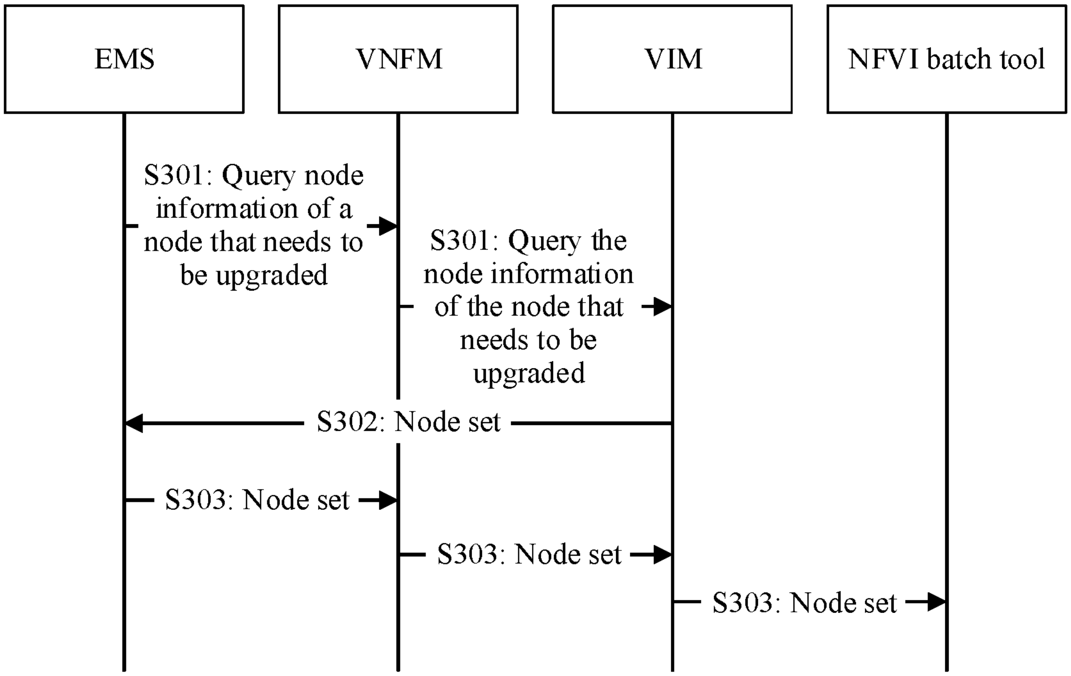
FIG. 4 is another flowchart of obtaining a node set according to an embodiment of this application.

For ease of understanding, refer to FIG. 4. FIG. 4 is another flowchart of obtaining a node set according to an embodiment of this application. As shown in FIG. 4, in step S301, an operator queries, by using the EMS via a VNFM, a VIM for node information of a node that needs to be upgraded. In step S302, the VIM obtains the node information by managing and monitoring infrastructure layer resources, and transmits a node set including the obtained node information to the EMS. Then, in step S303, the node set is delivered, by using the EMS, to the VIM via the VNFM. Then, the VIM sends the node set to the NFVI batch tool, so that the NFVI batch tool obtains the node set.

It should be understood that the examples in FIG. 3 and FIG. 4 are merely used to understand this solution. A specific procedure for obtaining a node set should be flexibly determined according to an actual situation.

S102: The NFVI batch tool obtains a node batch rule set.

In this embodiment, the NFVI batch tool obtains the node batch rule set, and the node batch rule set includes a node batch rule corresponding to each node type. Specifically, the node batch rule may include but is not limited to a priority of a node type, a quantity threshold of a node type, and a percentage threshold of a node type. For example, a node type A is reset in a prebatch, only one node type A is reset in each batch, a maximum reset percentage for node types B is 50%, a node type C is reset in a postbatch, and the like. A specific node batch rule is not limited herein.

Figure 5:
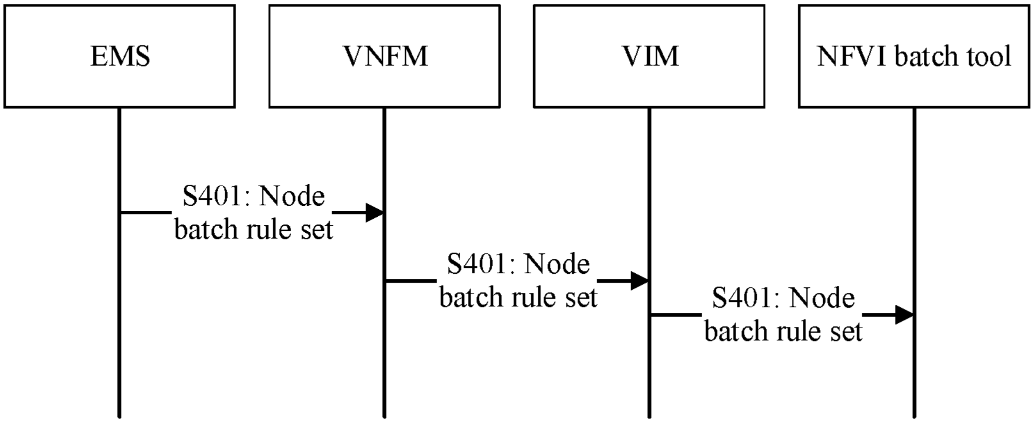
FIG. 5 is a flowchart of obtaining a node batch rule set according to an embodiment of this application.

Optionally, when there are a few node types, that is, there are also a few node batch rules corresponding to each node type included in the node batch rule set, the node batch rule set may be directly determined manually. Specifically, refer to FIG. 5. FIG. 5 is a flowchart of obtaining a node batch rule set according to an embodiment of this application. As shown in FIG. 5, in step S401, an operator delivers, by using the EMS via the VNFM, the determined node batch rule set to the VIM. Then, the VNFM sends the node batch rule set to the NFVI batch tool, so that the NFVI batch tool obtains the node batch rule set.

For example, refer to Table 2. Table 2 is an example of a batch rule when a node is a virtual machine.

TABLE 2

| Node type | Batch rule |
|---|---|
| OMU_VM | PreBatch & OnlyOneEachBatch |
| SPU_VM | MultipleEachBatch & 50% |
| CPU_VM | PostBatch & OnlyOneEachBatch |

A batch rule corresponding to the node type “OMU_VM” is “PreBatch & OnlyOneEachBatch”. That is, a node corresponding to the node type “OMU_VM” needs to be reset in a prebatch, and only one node is reset in each batch. A batch rule corresponding to the node type “SPU_VM” is “MultipleEachBatch & 50%”. That is, a maximum reset percentage for nodes corresponding to the node type “SPU_VM” in each batch is 50%. For example, when there are four nodes corresponding to the node type “SPU_VM”, as the maximum reset percentage of each batch is 50%, a maximum number of nodes corresponding to the node type “SPU_VM” in each batch is 2. That is, one or two nodes corresponding to the node type “SPU_VM” can be reset in each batch. A batch rule corresponding to the node type “CPU_VM” is “PostBatch & OnlyOneEachBatch”. That is, a node corresponding to the node type “CPU_VM” needs to be reset in a postbatch, and only one node is reset in each batch. It should be understood that the example in Table 2 is merely used for understanding this solution. A specific batch rule corresponding to a node type should be flexibly determined based on an actual situation.

Figure 6:
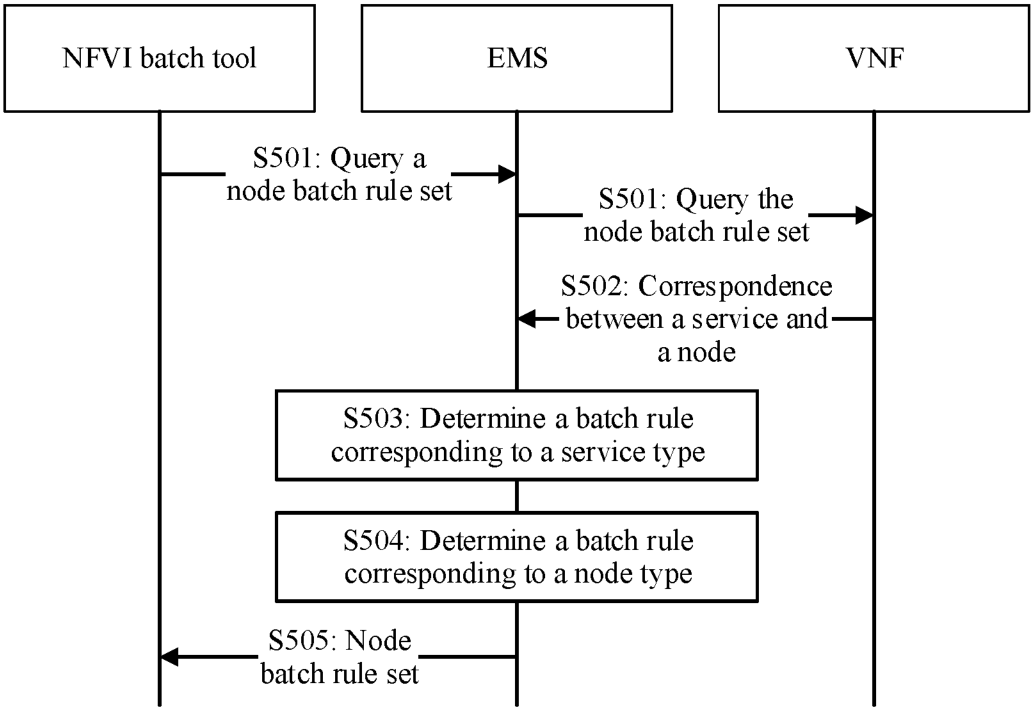
FIG. 6 is another flowchart of obtaining a node batch rule set according to an embodiment of this application.

Further, when there are a plurality of node types, the node batch rule set cannot be directly determined manually. For example, refer to FIG. 6. FIG. 6 is another flowchart of obtaining a node batch rule set according to an embodiment of this application. As shown in FIG. 6, in step S501, the NFVI batch tool may include but is not limited to querying and obtaining a node batch rule set from the VNF by using the EMS. In step S502, the VNF sends a correspondence between a service and a node to the EMS. In step S503, the EMS obtains and determines the correspondence between a service and a node, where the correspondence between a service and a node includes a correspondence between a service type and a node. Then, in step S503, the EMS determines a batch rule corresponding to the service type. Because each node in the node set corresponds to one node type, in step S504, the EMS may determine, based on the correspondence between a service and a node, a batch rule corresponding to the node type. Then, in step S505, the EMS obtains, based on a node type included in the node set, a node batch rule set that includes a node batch rule corresponding to each node type, and delivers the node batch rule set to the NFVI batch tool.

For example, the correspondence between a service and a node includes but is not limited to a service identifier, a service type, a node identifier, and a node type. For ease of understanding, refer to Table 3. Table 3 is an example of a correspondence between a service and a node when the node is a virtual machine. The correspondence includes a service identifier (Pod-Id) and a service type (Pod-Type) corresponding to each service, and a node identifier (Node-Id) and a node type (Node-Type) corresponding to each node.

TABLE 3

| Service identifier | Service type | Node identifier | Node type |
|---|---|---|---|
| pod-om-id-1 | om-pod | vm-omu-id-1 | OMU_VM |
| pod-om-id-2 | om-pod | vm-omu-id-2 | OMU_VM |
| pod-sp-id-1 | sp-pod | vm-spu-id-1 | SPU_VM |
| pod-sp-id-2 | sp-pod | vm-spu-id-2 | SPU_VM |
| pod-sp-id-3 | sp-pod | vm-spu-id-3 | SPU_VM |
| pod-sp-id-4 | sp-pod | vm-spu-id-4 | SPU_VM |
| pod-cp-id-1 | cp-pod | vm-cpu-id-1 | CPU_VM |
| pod-cp-id-2 | cp-pod | vm-cpu-id-2 | CPU_VM |

A service with a service type as "om-pod" corresponds to a node with a node type as "OMU_VM". A service with a service type as "sp-pod" corresponds to a node with a node type as "SPU_VM". A service with a service type as "cp-pod" corresponds to a node with a node type as "CPU_VM". Therefore, it can be learned that a node identifier corresponding to each node and a service identifier corresponding to each service are different, but different nodes may of a same node type. A same node type corresponds to a same service type.

Table 4 is an example of a batch rule when a node is a virtual machine.

TABLE 4

| Service type | Batch rule |
|---|---|
| om-pod | PreBatch & OnlyOneEachBatch |
| sp-pod | MultipleEachBatch & 50% |
| cp-pod | PostBatch & OnlyOneEachBatch |

A batch rule corresponding to the service type "om-pod" is "PreBatch & OnlyOneEachBatch". That is, a node corresponding to the service type "om-pod" needs to be reset in a prebatch, and only one node is reset in each batch. A batch rule corresponding to the service type "sp-pod" is "MultipleEachBatch & 50%". That is, a maximum reset percentage for nodes corresponding to the service type "sp-pod" in each batch is 50%. For example, when there are six nodes corresponding to the service type "sp-pod", as the maximum reset percentage of each batch is 50%, a maximum number of nodes corresponding to the service type "sp-pod" in each batch is 3. That is, one, two, or three nodes corresponding to the service type "sp-pod service" may be reset in each batch. Then, a batch rule corresponding to the service type "cp-pod" is "PostBatch & OnlyOneEachBatch". That is, a node corresponding to the service type "cp-pod" needs to be reset in a postbatch, and only one node is reset in each batch.

It should be understood that examples in Table 3 and Table 4 are merely used for understanding this solution. A specific correspondence between a service and a node and a specific batch rule corresponding to a service type should be flexibly determined based on an actual situation.

S103: The NFVI batch tool performs batching on the node set based on the node batch rule set, to obtain batch information for upgrading.

In this embodiment, after obtaining the node batch rule set and the node set by using the step S101 and step S102, the NFVI batch tool may perform batching on the node set based on the node batch rule set, to obtain the batch information for upgrading. Specifically, the batch information for upgrading includes an upgrade sequence of each group. In actual application, the batch information for upgrading may further include but is not limited to a node type of each group, an identifier corresponding to a group sequence of each group, a node identifier corresponding to a node in each group, and a host identifier corresponding to the node in each group. Specific batch information for upgrading should not be understood as a limitation of this embodiment of this application.

For ease of understanding, the node set is shown in Table 1 and the node batch rule set is shown in Table 2 as an example for description. It can be learned from Table 1 that node types included in the node set are "OMU_VM", "SPU_VM" and "CPU_VM". As shown in Table 2, a node corresponding to the node type "OMU_VM" needs to be reset in a prebatch, only one node is reset in each batch, a maximum reset percentage for nodes corresponding to the node type "SPU_VM" in each batch is 50%, a node corresponding to the node type "CPU_VM" needs to be reset in a postbatch, and only one node needs to be reset in each batch. Therefore, batching may be performed on the node set based on the foregoing node batch rule set, to obtain the batch information for upgrading.

For example, because a node corresponding to "OMU_VM" needs to be reset in a prebatch, and only one node is reset in each batch, two nodes with node identifiers as "vm-omu-id-1" and "vm-omu-id-2" corresponding to the node type "OMU_VM" cannot be reset in a same batch, and both need to be reset in a prebatch. That is, the nodes corresponding to the node identifiers "vm-omu-id-1" and "vm-omu-id-2" are separately batched to an upgrade batch with a higher ranking. Then, because the maximum reset percentage for nodes corresponding to "SPU_VM" in each batch is 50%, and the four node identifiers corresponding to the node type "SPU_VM" are nodes corresponding to "vm-spu-id-1" to "vm-spu-id-4". That is, only one or two nodes with node identifiers from "vm-spu-id-1" to "vm-spu-id-4" may be reset in each batch. Then, because a node corresponding to "CPU_VM" needs to be reset in a postbatch, and only one node is reset in each batch, two nodes with node identifiers as "vm-cpu-id-1" and "vm-cpu-id-2" corresponding to the node type "CPU_VM" cannot be reset in a same batch, and both need to be reset in a postbatch. That is, the nodes corresponding to the node identifiers "vm-cpu-id-1" and "vm-cpu-id-2" are separately batched to an upgrade batch with a lower ranking.

Based on the foregoing description, refer to Table 5. Table 5 is an example of batch information for upgrading obtained by performing batching on the node set shown in Table 1 based on the node batch rule set shown in Table 2. It should be understood that the example in Table 5 is only used for understanding this solution, and specific batch information for upgrading should be flexibly determined according to an actual situation.

TABLE 5

| Group sequence identifier | Node identifier | Node type | Host identifier |
|---|---|---|---|
| 1 | vm-omu-id-1 | OMU_VM | host-omu-id-1 |
| | vm-spu-id-1 | SPU_VM | host-spu-id-1 |
| | vm-spu-id-3 | SPU_VM | host-spu-id-3 |
| 2 | vm-omu-id-2 | OMU_VM | host-omu-id-2 |
| | vm-spu-id-2 | SPU_VM | host-spu-id-2 |
| | vm-spu-id-4 | SPU_VM | host-spu-id-4 |
| 3 | vm-cpu-id-1 | CPU_VM | host-cpu-id-1 |
| 4 | vm-cpu-id-2 | CPU_VM | host-cpu-id-2 |

S104: The NFVI upgrade tool obtains the batch information for upgrading.

In this embodiment, the NFVI upgrade tool obtains the batch information for upgrading from the NFVI batch tool.

S105: The NFVI upgrade tool determines a to-be-upgraded group node based on an upgrade sequence.

In this embodiment, because the batch information for upgrading includes an upgrade sequence of each group, the NFVI upgrade tool may determine the to-be-upgraded group node based on the upgrade sequence.

For example, the batch information for upgrading shown in Table 5 is used as an example for description. It can be learned from Table 5 that the NFVI upgrade tool may determine, based on the upgrade sequence, that a node included in a group with a group sequence identifier as "1" is a to-be-upgraded group node. That is, nodes corresponding to node identifiers vm-omu-id-1, vm-spu-id-1, and vm-spu-id-3 are to-be-upgraded group nodes.

S106: The VNFM obtains a first message.

In this embodiment, after the NFVI upgrade tool determines the to-be-upgraded group node, the NFVI upgrade tool may further send a first message to the VNFM, where the first message indicates the to-be-upgraded group node to be upgraded. In this way, the VNFM receives the first message sent by the NFVI upgrade tool, and the VNFM is triggered to perform step S107.

For example, the NFVI upgrade tool determines that nodes corresponding to the node identifiers "vm-omu-id-1", "vm-spu-id-1", and "vm-spu-id-3" are to-be-upgraded group nodes. In this case, the VNFM may determine, by using the first message, that nodes corresponding to node identifiers "vm-omu-id-1", "vm-spu-id-1", and "vm-spu-id-3" need to be upgraded.

S107: The VNFM migrates a service on the to-be-upgraded group node to another non-upgraded node.

In this embodiment, the VNFM migrates all services on the to-be-upgraded group node to the another non-upgraded node. Optionally, a node type of the to-be-upgraded group node is the same as that of the another non-upgraded node.

Figure 7:
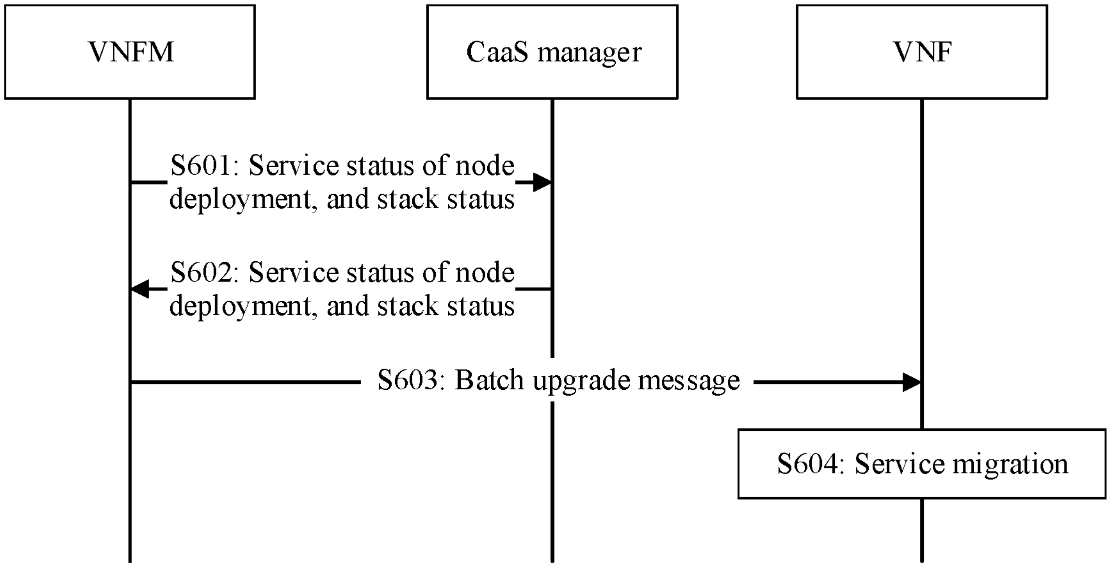
FIG. 7 is a flowchart of service migration according to an embodiment of this application.

For example, refer to FIG. 7. FIG. 7 is a flowchart of service migration according to an embodiment of this application. As shown in FIG. 7, in step S601, the VNFM queries a CaaS manager for a service status of node deployment and a stack status. In step S602, the CaaS manager feeds back the service status of node deployment and the stack status to the VNFM. When a stack is in a normal state, in step S603, the VNFM sends a batch upgrade message to the VNF, where the batch upgrade message includes a list of nodes whose services need to be migrated. That is, the to-be-upgraded group node is included, so that the VNF is triggered to migrate a service or traffic corresponding to the to-be-upgraded group node. Therefore, in step S604, the VNF migrates the service on the to-be-upgraded group node to the another non-upgraded node, thereby completing service migration. Optionally, in a process of migrating the service or traffic corresponding to the to-be-upgraded group node, the VNF may further notify the VNFM of a service or a traffic migration result and a progress. For example, migration of 80% of services of the to-be-upgraded group node is completed, or migration of the to-be-upgraded group node is completed, or migration of a node in to-be-upgraded group nodes fails, or the like. It should be understood that the foregoing examples are merely used to understand this solution, and a specific service migration process and manner should be flexibly determined based on an actual situation.

Figure 8:
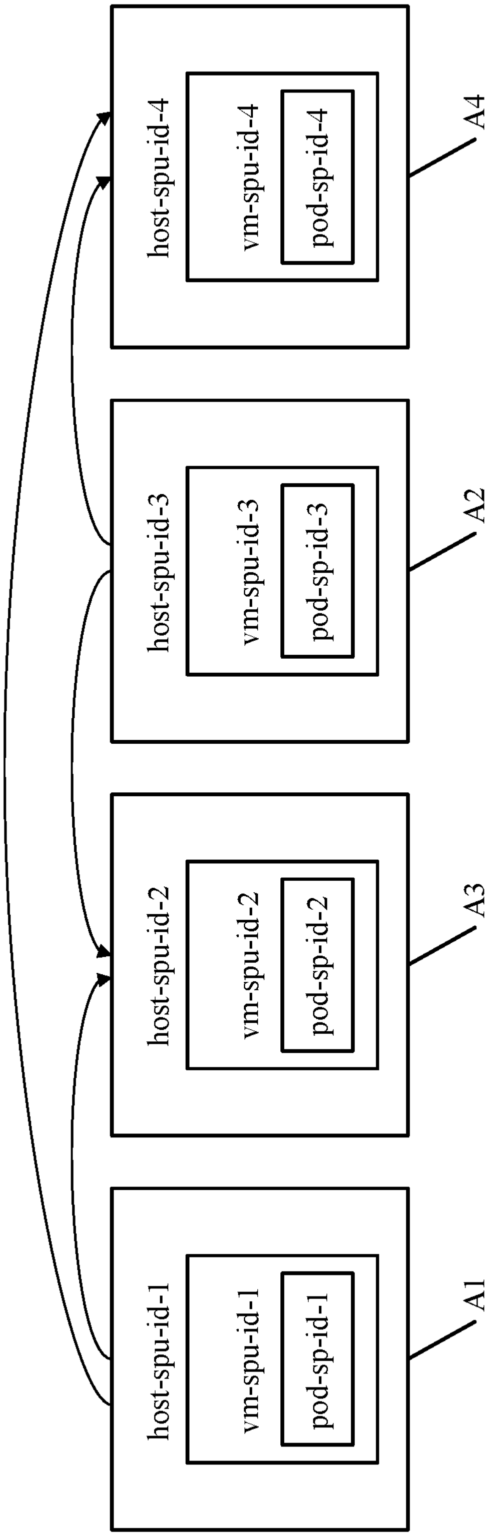
FIG. 8 is a schematic diagram of service migration according to an embodiment of this application.

Further, the VNFM needs to migrate an original service carried on the to-be-upgraded group node to a node that has a same node type and does not participate in upgrade. For example, Table 1 is used as an example for description. If to-be-upgraded group nodes are nodes corresponding to the node identifiers "vm-omu-id-1", "vm-spu-id-1", and "vm-spu-id-3", a non-upgraded node having a node type the same as that of a node corresponding to the node identifier "vm-omu-id-1" is a node corresponding to "vm-omu-id-2". Therefore, a service on the node corresponding to the node identifier "vm-omu-id-1" may be migrated to the node corresponding to the node identifier "vm-omu-id-2". Similarly, services on nodes corresponding to the node identifiers "vm-spu-id-1" and "vm-spu-id-3" may be migrated to at least one of nodes corresponding to the node identifiers "vm-spu-id-2" and "vm-spu-id-4". For ease of understanding, refer to FIG. 8. FIG. 8 is a schematic diagram of service migration according to an embodiment of this application. As shown in FIG. 8, A1 and A2 indicate to-be-upgraded group nodes, and A3 and A4 indicate non-upgraded nodes. It can be learned from the foregoing embodiment that: The to-be-upgraded group node A1, the to-be-upgraded group node A2, the non-upgraded node A3, and the non-upgraded node A4 all fall within the node type of "SPU_VM". Therefore, services of the to-be-upgraded group node A1 and the to-be-upgraded group node A2 may be migrated to the non-upgraded node A3 and the non-upgraded node A4 to ensure normal service running. The foregoing example is only used for understanding this solution. A specific non-upgraded node for service migration should be flexibly determined according to an actual situation.

In addition, the migration described in this embodiment of this application may be balanced migration or may be unbalanced migration. For example, a to-be-upgraded group node carries six services, and there are two non-upgraded nodes with a node type the same as that of the to-be-upgraded group node. In this case, the balanced migration needs to balance the six services to the two non-upgraded nodes, that is, the two non-upgraded nodes separately receive three migrated services. Similarly, the unbalanced migration means that the services do not need to be completely migrated in a balanced node, so that the six services may be directly migrated to one of the two non-upgraded nodes. The foregoing example is only used for understanding this solution. A specific quantity of services to be migrated should be flexibly determined according to an actual situation.

S108: The NFVI upgrade tool obtains a second message.

In this embodiment, considering a case in which the VNFM may correspond to a plurality of VNFs, the VNFM needs to integrate service migration processing progresses of the to-be-upgraded group node. That is, the VNF notifies the VNFM of a service or traffic migration result that the to-be-upgraded group node succeeds in service migration, that is, completes the service migration. In this case, the to-be-upgraded group node carries no serviced and can be upgraded. Therefore, the VNFM sends the second message to the NFVI upgrade tool, to indicate that all services on the to-be-upgraded group node are migrated to the another non-upgraded node, that is, the NFVI upgrade tool obtains the second message sent by the VNFM.

Then, if any one of the to-be-upgraded group nodes fails, it is determined that the migration fails. In this case, the VNFM does not send the second message to the NFVI upgrade tool.

S109: The NFVI upgrade tool upgrades the to-be-upgraded group node.

In this embodiment, after obtaining the second message in step S108, the NFVI upgrade tool may determine that all services on the group node are migrated to the another non-upgraded node, that is, no service is carried in the to-be-upgraded group node. In this case, the NFVI upgrade tool notifies the NFVI layer (invoking a VIM interface) to upgrade the to-be-upgraded group node. For example, a process of upgrading the to-be-upgraded group node includes but is not limited to: disabling the to-be-upgraded group node, resetting a host, loading software of a new version, and then restarting and enabling the to-be-upgraded group node.

S110: The VNFM obtains a third message.

In this embodiment, after determining that the to-be-upgraded group node is upgraded, the NFVI upgrade tool needs to send the third message to the VNFM. The third message indicates that the to-be-upgraded group node is upgraded. Therefore, the VNFM obtains the third message sent by the NFVI upgrade tool.

S111: The VNFM migrates a service on the another non-upgraded node to a group node that is upgraded.

In this embodiment, after obtaining the third message in step S110, the VNFM may determine that the to-be-upgraded group node is upgraded. In this case, the service on the another non-upgraded node needs to be migrated to the group node that is upgraded. A mode of migrating a service is similar to that in step S107. Details are not described herein again.

It may be understood that some services on the another non-upgrade node are migrated to the group node that is upgraded, but not all services are migrated. This ensures that all service nodes carry services at this time.

Optionally, a difference between a quantity of services carried in the another non-upgraded node after the service migration is completed and a quantity of services carried in the group node that is upgraded may be less than a preset threshold, to achieve traffic balancing. For example, a quantity of services carried in the another non-upgraded node after the service migration is completed is 990 per single node, and a quantity of services carried in the group node that is upgraded is 980 per single node. In this case, it may be determined that traffic balancing is achieved. Alternatively, a service load carried in the another non-upgraded node after the service migration is completed is 90% per single node, and a service load carried in the group node that is upgraded is 85% per single node. In this case, it may be determined that traffic balancing is achieved. It should be understood that the foregoing examples are merely used for understanding this solution, and should not be understood as a limitation on this embodiment of this application.

S112: The NFVI upgrade tool obtains a fourth message.

In this embodiment, considering a case in which the VNFM may correspond to a plurality of VNFs, the VNFM needs to integrate service migration processing progresses of the another non-upgraded node. That is, the VNF notifies the VNFM of a service or traffic migration result that the another non-upgraded node succeeds in service migration, that is, completes the service migration. In this case, a service is carried in the to-be-upgraded group node again. Therefore, the VNFM sends the fourth message to the NFVI upgrade tool, to indicate that the service on the another non-upgraded node is migrated to the group node that is upgraded, that is, the NFVI upgrade tool obtains the fourth message sent by the VNFM.

Then, if any one of the non-upgraded nodes fails, it is determined that the migration fails. In this case, the VNFM does not send the fourth message to the NFVI upgrade tool.

S113: The NFVI upgrade tool determines a next to-be-upgraded group node based on the upgrade sequence.

In this embodiment, because the batch information for upgrading includes an upgrade sequence of each group, the NFVI upgrade tool may determine the next to-be-upgraded group node based on the upgrade sequence.

For example, the batch information for upgrading shown in Table 5 is used as an example for description. It can be learned from Table 5 that, if a node included in a group corresponding to the group sequence identifier "1" is the to-be-upgraded group node, it may be determined, based on the upgrade sequence, that the next to-be-upgraded group node is a node included in a group corresponding to the group sequence identifier "2". That is, nodes corresponding to the node identifiers "vm-omu-id-2", "vm-spu-id-2", and "vm-spu-id-4" are next to-be-upgraded group nodes.

S114: The VNFM obtains a first message.

In this embodiment, after the NFVI upgrade tool determines the to-be-upgraded group node, the NFVI upgrade tool may further send the first message to the VNFM, where the first message indicates the next to-be-upgraded group node to be upgraded. In this way, the VNFM receives the first message sent by the NFVI upgrade tool, and the VNFM is triggered to perform step S115.

S115: The VNFM migrates a service on the next to-be-upgraded group node to another non-upgraded node.

In this embodiment, a manner in which the VNFM migrates all services on the next to-be-upgraded group node to the another non-upgraded node is similar to step S107. Details are not described herein again.

S116: The NFVI upgrade tool obtains a second message.

In this embodiment, a manner in which the NFVI upgrade tool obtains the second message is similar to that in step S108. Details are not described herein again. The second information indicates that all services on the next to-be-upgraded group node are migrated to the another non-upgraded node.

S117: The NFVI upgrade tool upgrades the next to-be-upgraded group node.

In this embodiment, a manner in which the NFVI upgrade tool upgrades the next to-be-upgraded group node is similar to that in step S109. Details are not described herein again.

2. The NFVI Batch Upgrade Tool and NFVI Upgrade Tool are Integrated as an NFVI Batch Upgrade Tool.

Figure 9A:
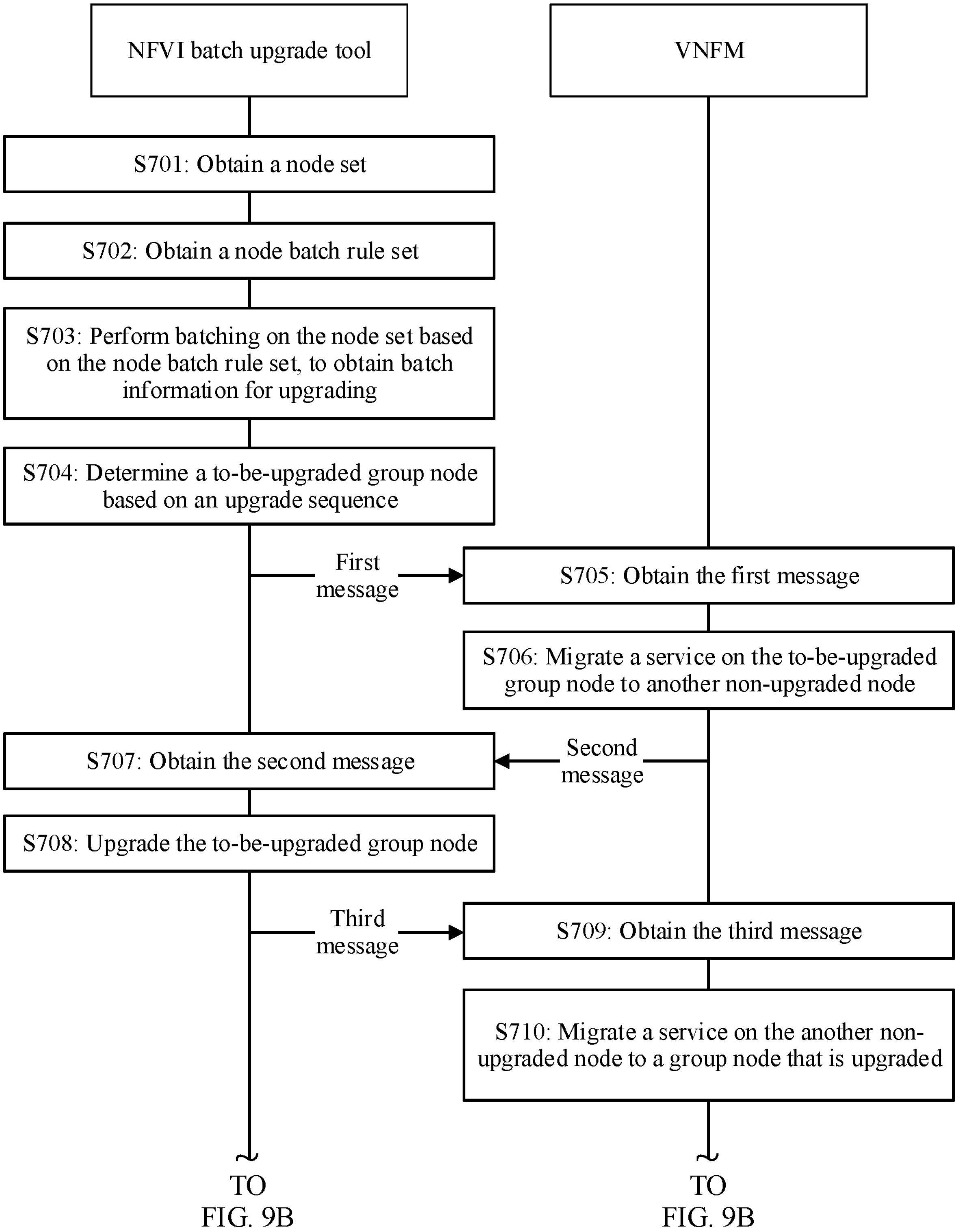
FIG. 9A and FIG. 9B are a schematic diagram of another method for upgrading nodes in batches according to an embodiment of this application.
Figure 9B:
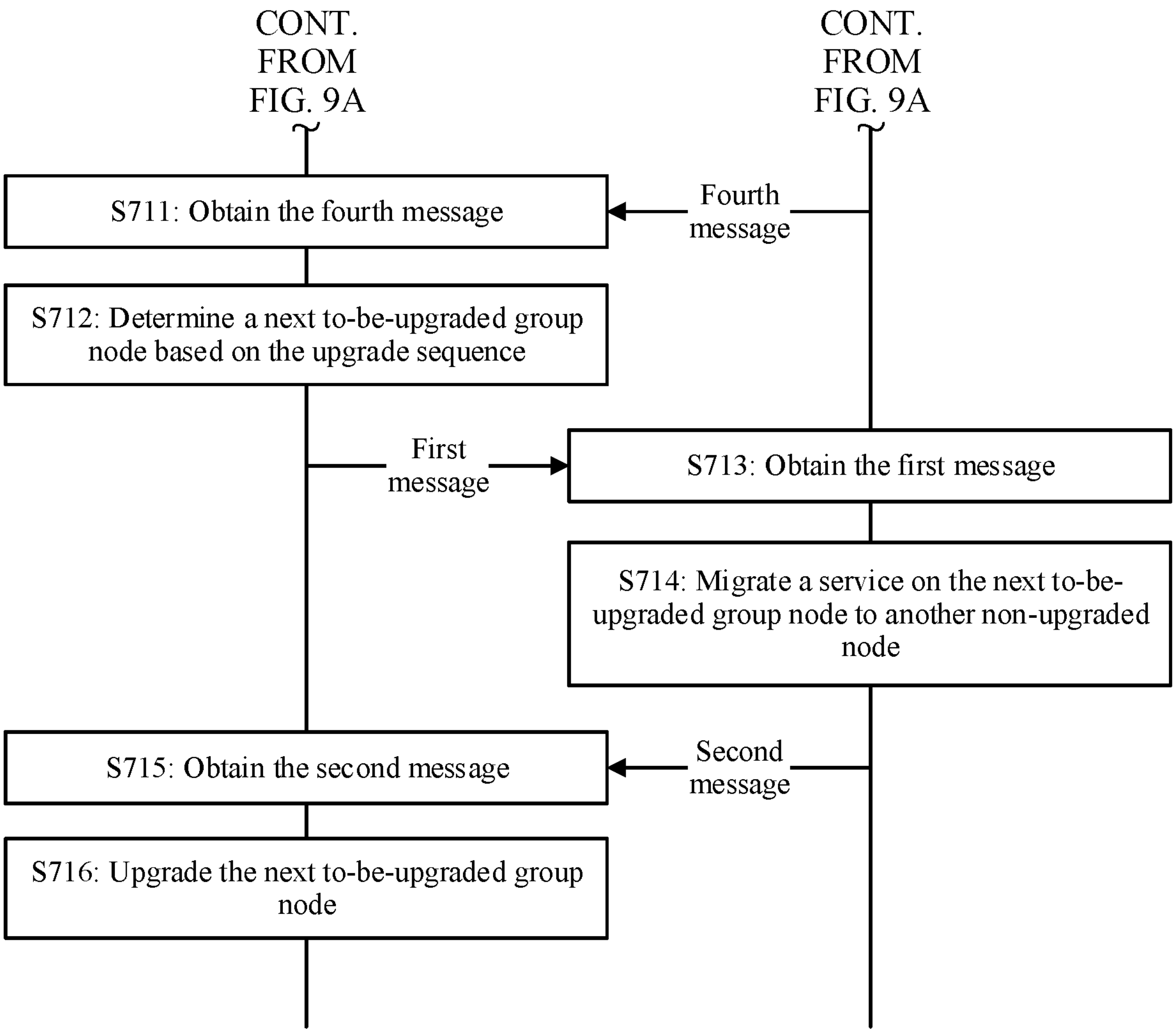

FIG. 9A and FIG. 9B are a schematic diagram of another method for upgrading nodes in batches according to an embodiment of this application. As shown in FIG. 9A and FIG. 9B, the method for upgrading nodes in batches includes the following steps.

S701: The NFVI batch upgrade tool obtains a node set.

In this embodiment, a manner in which the NFVI batch upgrade tool obtains the node set is similar to that in step S101. Details are not described herein again.

S702: The NFVI batch upgrade tool obtains a node batch rule set.

In this embodiment, a manner in which the NFVI batch upgrade tool obtains the node batch rule set is similar to that in step S102. Details are not described herein again.

S703: The NFVI batch upgrade tool performs batching on the node set based on the node batch rule set, to obtain batch information for upgrading.

In this embodiment, a manner in which the NFVI batch upgrade tool performs batching on the node set based on the node batch rule set, to obtain the batch information for upgrading is similar to that in step S103. Details are not described herein again.

S704: The NFVI batch upgrade tool determines a to-be-upgraded group node based on an upgrade sequence.

In this embodiment, because the batch information for upgrading obtained by the NFVI batch upgrade tool includes an upgrade sequence of each group, the NFVI batch upgrade tool may determine the to-be-upgraded group node based on the upgrade sequence. A manner in which the NFVI batch upgrade tool determines the to-be-upgraded group node based on the upgrade sequence is similar to that in step S105. Details are not described herein again.

S705: The VNFM obtains a first message.

In this embodiment, a manner in which the VNFM obtains the first message is similar to that in step S106. Details are not described herein again.

S706: The VNFM migrates a service on the to-be-upgraded group node to another non-upgraded node.

In this embodiment, a manner in which the VNFM migrates the service on the to-be-upgraded group node to the another non-upgraded node is similar to step S107. Details are not described herein again.

S707: The NFVI batch upgrade tool obtains a second message.

In this embodiment, a manner in which the NFVI batch upgrade tool obtains the second message is similar to that in step S108. Details are not described herein again.

S708: The NFVI batch upgrade tool upgrades the to-be-upgraded group node.

In this embodiment, a manner in which the NFVI batch upgrade tool upgrades the to-be-upgraded group node is similar to that in step S109. Details are not described herein again.

S709: The VNFM obtains a third message.

In this embodiment, a manner in which the VNFM obtains the third message is similar to that in step S110. Details are not described herein again.

S710: The VNFM migrates a service on the another non-upgraded node to a group node that is upgraded.

In this embodiment, a manner in which the VNFM migrates the service on the another non-upgraded group node to the group node that is upgraded is similar to that in step S111. Details are not described herein again.

S711: The NFVI batch upgrade tool obtains a fourth message.

In this embodiment, a manner in which the NFVI batch upgrade tool obtains the fourth message is similar to that in step S112. Details are not described herein again.

S712: The NFVI batch upgrade tool determines a next to-be-upgraded group node based on the upgrade sequence.

In this embodiment, a manner in which the NFVI batch upgrade tool determines the next to-be-upgraded group node based on the upgrade sequence is similar to that in step S113. Details are not described herein again.

S713: The VNFM obtains a first message.

In this embodiment, a manner in which the VNFM obtains the first message is similar to that in step S114. Details are not described herein again.

S714: The VNFM migrates a service on the next to-be-upgraded group node to another non-upgraded node.

In this embodiment, a manner in which the VNFM migrates the service on the next to-be-upgraded group node to the another non-upgraded node is similar to that in step S115. Details are not described herein again.

S715: The NFVI batch upgrade tool obtains a second message.

In this embodiment, a manner in which the NFVI batch upgrade tool obtains the second message is similar to that in step S116. Details are not described herein again.

S716: The NFVI batch upgrade tool upgrades the next to-be-upgraded group node.

In this embodiment, a manner in which the NFVI batch upgrade tool upgrades the next to-be-upgraded group node is similar to that in step S117. Details are not described herein again.

The foregoing mainly describes the solutions provided in embodiments of this application from the perspective of the methods. It may be understood that, to implement the foregoing functions, the apparatus for upgrading nodes in batches includes a hardware structure and/or a software module for performing a corresponding function. A person of ordinary skill in the art should easily be aware that, in combination with the example modules and algorithm steps described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the apparatus for upgrading nodes in batches may be divided into function modules based on the foregoing method embodiment. For example, each function module may be obtained through division based on each corresponding function, or two or more functions may be integrated into one processing module. The integrated module may be implemented in a form of hardware, or may be implemented in a form of a software function module. It should be noted that, in embodiments of this application, module division is an example, and is merely a logical function division. During actual implementation, another division manner may be used.

Figure 10:
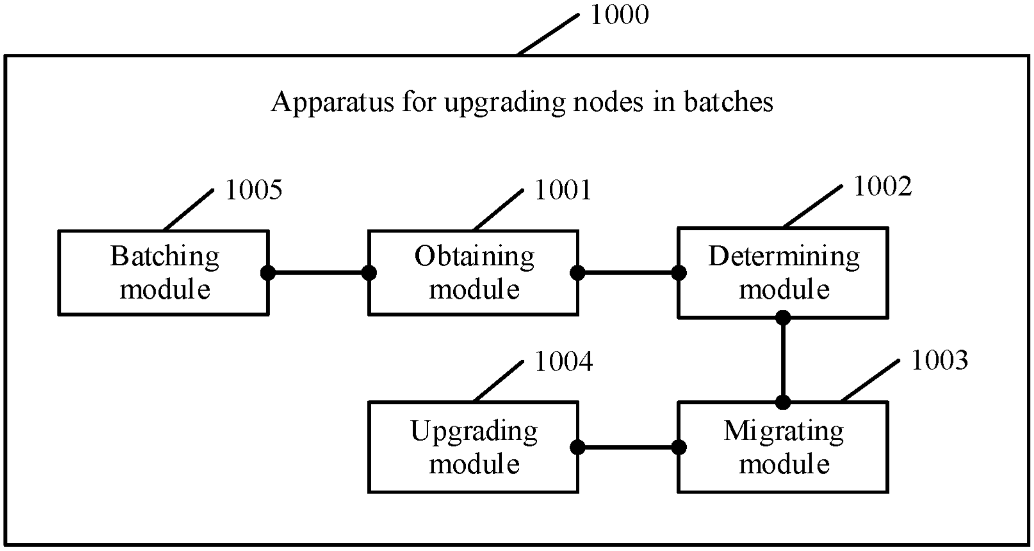
FIG. 10 is a schematic diagram of an apparatus for upgrading nodes in batches according to an embodiment of this application.

The following describes in detail an apparatus for upgrading nodes in batches in this application. FIG. 10 is a schematic diagram of an apparatus for upgrading nodes in batches according to an embodiment of this application. As shown in FIG. 10, the apparatus 1000 for upgrading nodes in batches includes:

- an obtaining module 1001, configured to obtain batch information for upgrading, where the batch information for upgrading includes an upgrade sequence of each group;
- a determining module 1002, configured to determine a to-be-upgraded group node based on the upgrade sequence;
- a migrating module 1003, configured to migrate a service on the to-be-upgraded group node to another non-upgraded node; and
- an upgrading module 1004, configured to upgrade the to-be-upgraded group node.

In an embodiment, based on the embodiment corresponding to FIG. 10, in another embodiment of the apparatus 1000 for upgrading nodes in batches provided in this embodiment of this application, the migrating module 1003 is further configured to: after the to-be-upgraded group node is upgraded, migrate a service on the another non-upgraded node to a group node that is upgraded.

In an embodiment, based on the embodiment corresponding to FIG. 10, in another embodiment of the apparatus 1000 for upgrading nodes in batches provided in this embodiment of this application, the determining module 1002 is further configured to: after the service on the another non-upgraded node is migrated to the group node that is upgraded, determine a next to-be-upgraded group node based on the upgrade sequence.

The migrating module 1003 is further configured to migrate a service on the next to-be-upgraded group node to another non-upgraded node.

The upgrading module 1004 is further configured to upgrade the next to-be-upgraded group node.

In an embodiment, based on the embodiment corresponding to FIG. 10, in another embodiment of the apparatus 1000 for upgrading nodes in batches provided in this embodiment of this application, each group includes a node type of each group, an identifier corresponding to a group sequence of each group, a node identifier corresponding to a node in each group, and a host identifier corresponding to the node in each group A node type of the to-be-upgraded group node is the same as that of the another non-upgraded node.

In an embodiment, based on the embodiment corresponding to FIG. 10, in another embodiment of the apparatus 1000 for upgrading nodes in batches provided in this embodiment of this application, the apparatus 1000 for upgrading nodes in batches further includes a batching module 1005.

The obtaining module 1001 is further configured to obtain a node set before obtaining the batch information for upgrading. Each node in the node set corresponds to one node type.

The obtaining module 1001 is further configured to obtain a node batch rule set. The node batch rule set includes a node batch rule corresponding to each node type.

The batching module 1005 is configured to perform batching on the node set based on the node batch rule set, to obtain the batch information for upgrading.

In an embodiment, based on the embodiment corresponding to FIG. 10, in another embodiment of the apparatus 1000 for upgrading nodes in batches provided in this embodiment of this application, the determining module 1002 is further configured to determine a service running on a node. The service corresponds to a service type.

The determining module 1002 is further configured to determine a batch rule corresponding to the service type.

The determining module 1002 is further configured to determine, according to the batch rule corresponding to the service type, a node batch rule corresponding to the node type.

In an embodiment, based on the embodiment corresponding to FIG. 10, in another embodiment of the apparatus 1000 for upgrading nodes in batches provided in this embodiment of this application, the obtaining module 1001 is further configured to obtain a first message before the service on the to-be-upgraded group node is migrated to the another non-upgraded node. The first message indicates the to-be-upgraded group node to be upgraded.

In an embodiment, based on the embodiment corresponding to FIG. 10, in another embodiment of the apparatus 1000 for upgrading nodes in batches provided in this embodiment of this application, the obtaining module 1001 is further configured to obtain a second message before the to-be-upgraded group node is upgraded. The second message indicates that all services on the to-be-upgraded group node are migrated to the another non-upgraded node.

In an embodiment, based on the embodiment corresponding to FIG. 10, in another embodiment of the apparatus 1000 for upgrading nodes in batches provided in this embodiment of this application, the obtaining module 1001 is further configured to obtain a third message before the service on the another non-upgraded node is migrated to the group node that is upgraded. The third message indicates that the to-be-upgraded group node is upgraded.

In an embodiment, based on the embodiment corresponding to FIG. 10, in another embodiment of the apparatus 1000 for upgrading nodes in batches provided in this embodiment of this application, the obtaining module 1001 is further configured to obtain a fourth message before the next to-be-upgraded group node is determined based on the upgrade sequence. The fourth message indicates that the service on the another non-upgraded node is migrated to the group node that is upgraded.

This application further provides an apparatus for upgrading nodes in batches, including at least one processor. The at least one processor is configured to execute a computer program stored in a memory, so that the apparatus for upgrading nodes in batches performs a method performed by an NFVI batch tool, an NFVI upgrade tool, an NFVI batch upgrade tool, and a VNFM in any one of the foregoing method embodiments.

It should be understood that the foregoing apparatus for upgrading nodes in batches may be one or more chips. For example, the apparatus for upgrading nodes in batches may be a field programmable gate array (FPGA), an application-specific integrated chip (ASIC), a system on chip (SoC), a central processor unit (CPU), a network processor (NP), a digital signal processor (DSP) circuit, a micro controller unit (MCU), a programmable controller (PLD), or another integrated chip.

An embodiment of this application further provides an apparatus for upgrading nodes in batches, including a processor and a communication interface. The communication interface is coupled to the processor. The communication interface is configured to input and/or output information. The information includes at least one of instructions and data. The processor is configured to execute a computer program, so that the apparatus for upgrading nodes in batches performs a method performed by an NFVI batch tool, an NFVI upgrade tool, an NFVI batch upgrade tool, and a VNFM in any one of the foregoing method embodiments.

An embodiment of this application further provides an apparatus for upgrading nodes in batches, including a processor and a memory. The memory is configured to store a computer program, and the processor is configured to invoke and run the computer program from the memory, so that the apparatus for upgrading nodes in batches performs a method performed by an NFVI batch tool, an NFVI upgrade tool, an NFVI batch upgrade tool, and a VNFM in any one of the foregoing method embodiments.

In a process embodiment, steps in the foregoing methods can be implemented by using a hardware integrated logical circuit in the processor, or by using instructions in a form of software. Steps of the methods disclosed with reference to embodiments of this application may be directly performed and accomplished by a hardware processor, or may be performed and accomplished by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly performed and accomplished by a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

According to the methods provided in embodiments of this application, this application further provides a computer program product. The computer program product includes computer program code. When the computer program code is run on a computer, the computer is enabled to perform a method performed by an NFVI batch tool, an NFVI upgrade tool, an NFVI batch upgrade tool, and a VNFM in the embodiments shown in FIG. 2A and FIG. 2B to FIG. 9A and FIG. 9B.

According to the methods provided in embodiments of this application, this application further provides a computer-readable storage medium. The computer-readable storage medium stores computer program code. When the computer program code is run on a computer, the computer is enabled to perform a method performed by an NFVI batch tool, an NFVI upgrade tool, an NFVI batch upgrade tool, and a VNFM in the embodiments shown in FIG. 2A and FIG. 2B to FIG. 9A and FIG. 9B.

According to the methods provided in embodiments of this application, this application further provides a system, including one or more of an NFVI batch tool, an NFVI upgrade tool, an NFVI batch upgrade tool, and a VNFM.

The NFVI batch tool, the NFVI upgrade tool, the NFVI batch upgrade tool, or the VNFM in the foregoing apparatus embodiments completely correspond to the NFVI batch tool, the NFVI upgrade tool, the NFVI batch upgrade tool or the VNFM in the method embodiments, and execute steps by using corresponding modules or units. For example, a communication unit (a transceiver) performs receiving or sending steps in the method embodiments, and other steps except sending and receiving may be performed by a processing unit (a processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed.

In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for upgrading nodes in batches, comprising:
- obtaining a node set, wherein each node in the node set corresponds to a respective node type;
- determining a service running on a node, wherein the service corresponds to a service type;
- determining a batch rule corresponding to the service type;
- determining a node batch rule corresponding to a node type based on the batch rule corresponding to the service type;
- obtaining a node batch rule set, wherein the node batch rule set comprises the node batch rule corresponding to each respective node type;
- obtaining batch information for upgrading based on the node batch rule set, wherein the batch information for upgrading comprises a plurality of groups of nodes and an upgrade sequence of each group of the plurality of groups of nodes;
- determining a to-be-upgraded group node based on the upgrade sequence;
- migrating a service on the to-be-upgraded group node to another non-upgraded node; and
- upgrading the to-be-upgraded group node.

2. The method according to claim 1, wherein after the to-be-upgraded group node is upgraded, the method further comprises:
- migrating a service on the another non-upgraded node to a group node that is upgraded.

3. The method according to claim 2, wherein after the migrating a service on the another non-upgraded node to a group node that is upgraded, the method further comprises:
- determining a next to-be-upgraded group node based on the upgrade sequence;
- migrating a service on the next to-be-upgraded group node to another non-upgraded node; and
- upgrading the next to-be-upgraded group node.

4. The method according to claim 3, wherein before the determining a next to-be-upgraded group node based on the upgrade sequence, the method further comprises:
- obtaining a fourth message, wherein the fourth message indicates that the service on the another non-upgraded node is migrated to the group node that is upgraded.

5. The method according to claim 2, wherein before the migrating a service on the another non-upgraded node to a group node that is upgraded, the method further comprises:
- obtaining a third message, wherein the third message indicates that the to-be-upgraded group node is upgraded.

6. The method according to claim 1, wherein each group comprises a node type of each group, an identifier corresponding to a group sequence of each group, a node identifier corresponding to a node in each group, and a host identifier corresponding to the node in each group; and
- a node type of the to-be-upgraded group node is the same as that of the another non-upgraded node.

7. The method according to claim 1, wherein before the migrating a service on the to-be-upgraded group node to another non-upgraded node, the method further comprises:
- obtaining a first message, wherein the first message indicates the to-be-upgraded group node to be upgraded.

8. The method according to claim 1, wherein before the upgrading the to-be-upgraded group node, the method further comprises:
- obtaining a second message, wherein the second message indicates that all services on the to-be-upgraded group node are migrated to the another non-upgraded node.

9. An apparatus for upgrading nodes in batches, comprising:
- a processor, configured to:
- obtain a node set, wherein each node in the node set corresponds to a respective node type;
- determine a service running on a node, wherein the service corresponds to a service type;
- determine a batch rule corresponding to the service type;
- determine a node batch rule corresponding to a node type based on the batch rule corresponding to the service type;
- obtain a node batch rule set, wherein the node batch rule set comprises the node batch rule corresponding to each respective node type;
- obtain batch information for upgrading based on the node batch rule set, wherein the batch information for upgrading comprises a plurality of groups of nodes and an upgrade sequence of each group of the plurality of groups of nodes;
- determine a to-be-upgraded group node based on the upgrade sequence;
- migrate a service on the to-be-upgraded group node to another non-upgraded node; and
- configured to upgrade the to-be-upgraded group node.

10. The apparatus for upgrading nodes in batches according to claim 9, wherein the processor is further configured to: after the to-be-upgraded group node is upgraded, migrate a service on the another non-upgraded node to a group node that is upgraded.

11. The apparatus for upgrading nodes in batches according to claim 10, wherein the processor is further configured to, after the service on the another non-upgraded node is migrated to the group node that is upgraded, determine a next to-be-upgraded group node based on the upgrade sequence;

the processor is further configured to migrate a service on the next to-be-upgraded group node to another non-upgraded node; and the processor is further configured to upgrade the next to-be-upgraded group node.

12. The apparatus for upgrading nodes in batches according to any claim 11, wherein the obtaining module is further configured to obtain a fourth message before the next to-be-upgraded group node is determined based on the upgrade sequence, wherein the fourth message indicates that the service on the another non-upgraded node is migrated to the group node that is upgraded.

13. The apparatus for upgrading nodes in batches according to claim 10, wherein the processor is further configured to obtain a third message before the service on the another non-upgraded node is migrated to the group node that is upgraded, wherein the third message indicates that the to-be-upgraded group node is upgraded.

14. The apparatus for upgrading nodes in batches according to claim 9, wherein each group comprises a node type of each group, an identifier corresponding to a group sequence of each group, a node identifier corresponding to a node in each group, and a host identifier corresponding to a node in each group; and a node type of the to-be-upgraded group node is the same as that of the another non-upgraded node.

15. The apparatus for upgrading nodes in batches according to claim 9, wherein the processor is further configured to obtain a first message before the service on the to-be-upgraded group node is migrated to the another non-upgraded node, wherein the first message indicates the to-be-upgraded group node to be upgraded.

16. The apparatus for upgrading nodes in batches according to claim 9, wherein the processor is further configured to obtain a second message before the to-be-upgraded group node is upgraded, wherein the second message indicates that all services on the to-be-upgraded group node are migrated to the another non-upgraded node.

* * * * *